United States Patent
Afsar et al.

(10) Patent No.: US 12,087,187 B2
(45) Date of Patent: Sep. 10, 2024

(54) ELECTRONIC DEVICES WITH DEFORMATION-RESISTANT DISPLAYS

(71) Applicant: Apple Inc., Cupertino, CA (US)

(72) Inventors: Yasmin F. Afsar, San Jose, CA (US); Ben Hightower, Redwood City, CA (US); Bhadrinarayana Lalgudi Visweswaran, San Mateo, CA (US); Chang-Chia Huang, San Jose, CA (US); Hoon Sik Kim, San Jose, CA (US); Paul S. Drzaic, Morgan Hill, CA (US); Prashant Mandlik, Sunnyvale, CA (US); Terry C. Lam, Mountain View, CA (US); Wen-I Hsieh, Campbell, CA (US); Zhichun Shao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/580,080

(22) Filed: Jan. 20, 2022

(65) Prior Publication Data

US 2022/0270522 A1 Aug. 25, 2022

Related U.S. Application Data

(60) Provisional application No. 63/153,824, filed on Feb. 25, 2021.

(51) Int. Cl.
*G06F 1/16* (2006.01)
*G09F 9/33* (2006.01)
*G02B 5/30* (2006.01)

(52) U.S. Cl.
CPC .............. *G09F 9/33* (2013.01); *G02B 5/3025* (2013.01); *G06F 1/1652* (2013.01)

(58) Field of Classification Search
CPC ......... G09F 9/33; G09F 9/301; G02B 5/3025; G02B 1/14; G06F 1/1652
See application file for complete search history.

(56) References Cited

U.S. PATENT DOCUMENTS

| | | | |
|---|---|---|---|
| 9,947,882 B2 * | 4/2018 | Zhang | H10K 59/879 |
| 10,056,443 B2 * | 8/2018 | Shyu | G06F 3/041 |
| 10,734,612 B2 | 8/2020 | Wu et al. | |
| 10,755,991 B2 | 8/2020 | Park et al. | |
| 10,833,106 B2 | 11/2020 | Ke | |

(Continued)

FOREIGN PATENT DOCUMENTS

| | | | | |
|---|---|---|---|---|
| CN | 111091760 A | * | 5/2020 | ........... G06F 1/1616 |
| CN | 112086021 A | | 12/2020 | |
| CN | 212484202 U | * | 2/2021 | |

*Primary Examiner* — Rockshana D Chowdhury
(74) *Attorney, Agent, or Firm* — Treyz Law Group, P.C.; Tianyi He

(57) ABSTRACT

A flexible display in a foldable electronic device may have a display cover layer and display panel that bend around a bend axis. The display panel may have an array of pixels configured to display an image through the display cover layer. The pixels may be formed from thin-film display circuitry that is supported by a flexible display panel substrate. The flexible substrate may be supported by a display support plate that bends about the bend axis. The display may be configured to allow attachment of the display panel substrate to the display support plate while helping to prevent undesired localized deformation of the thin-film display circuitry.

23 Claims, 23 Drawing Sheets

(56) References Cited

U.S. PATENT DOCUMENTS

| | | |
|---|---|---|
| 10,930,883 B2 | 2/2021 | Park |
| 11,081,660 B2 * | 8/2021 | Lee .................... G02F 1/133305 |
| 11,690,280 B2 * | 6/2023 | Lee ...................... H10K 59/131 |
| | | 257/40 |
| 2017/0033327 A1 * | 2/2017 | Tajima ................. H01M 50/119 |
| 2019/0132987 A1 | 5/2019 | Koo et al. |
| 2020/0209925 A1 * | 7/2020 | Paek .................... H10K 77/111 |
| 2021/0108080 A1 * | 4/2021 | Jang ...................... G06F 1/1652 |
| 2022/0141967 A1 * | 5/2022 | Gu ....................... H05K 5/0017 |
| | | 361/807 |

* cited by examiner

ELECTRONIC DEVICES WITH DEFORMATION-RESISTANT DISPLAYS

This application claims the benefit of provisional patent application No. 63/153,824, filed Feb. 25, 2021, which is hereby incorporated by reference herein in its entirety.

FIELD

This relates generally to electronic devices, and, more particularly, to electronic devices with displays.

BACKGROUND

Electronic devices often have displays. Displays may include sensing circuitry such as circuitry that detects input from a finger or stylus. During operation, a display may gather input from a user with the sensing circuitry while presenting the user with images for viewing.

SUMMARY

An electronic device may have a display that is resistant to deformation-induced damage due to contact by a finger, stylus, or other external object. The electronic device may be a foldable electronic device having a foldable display. The foldable display may have a display cover layer and display panel that bend around a bend axis.

The display panel may have an array of pixels configured to display an image through the display cover layer. The pixels may be formed from thin-film display circuitry that is supported by a flexible substrate. The flexible substrate may be supported by a display support plate that bends about the bend axis. If desired, the flexible substrate may be supported by a display support plate that bends about multiple axes (e.g., in a tri-fold device). Arrangements in which a flexible or rigid display are supported by a rigid support plate may also be used (e.g., in a device where the display is covered with a thin and/or soft cover layer).

The display support plate may be formed from a stiff layer that resists deformation when pressure is applied to the display from an external object such as a computer stylus. Thermoplastic polymer bonding, polymer adhesive bonding, and/or other attachment techniques may be used in attaching the display substrate to the display support plate. In an illustrative arrangement, the excessive use of soft material between the support plate and substrate is avoided to help prevent undesired localized deformation of the thin-film display circuitry.

DETAILED DESCRIPTION

Electronic devices may be provided with displays. Displays may be used for displaying images for users. Displays may be formed from arrays of light-emitting diode pixels, liquid crystal display pixels, or other pixels. For example, a device may have an organic light-emitting diode display, a display formed from an array of micro-light-emitting diodes (e.g., diodes formed from crystalline semiconductor dies), or a liquid crystal display. These displays may, if desired, be flexible. Flexible displays may be used in folding devices and other devices in which display panel structures are configured to bend about a bend axis.

Figure 1:
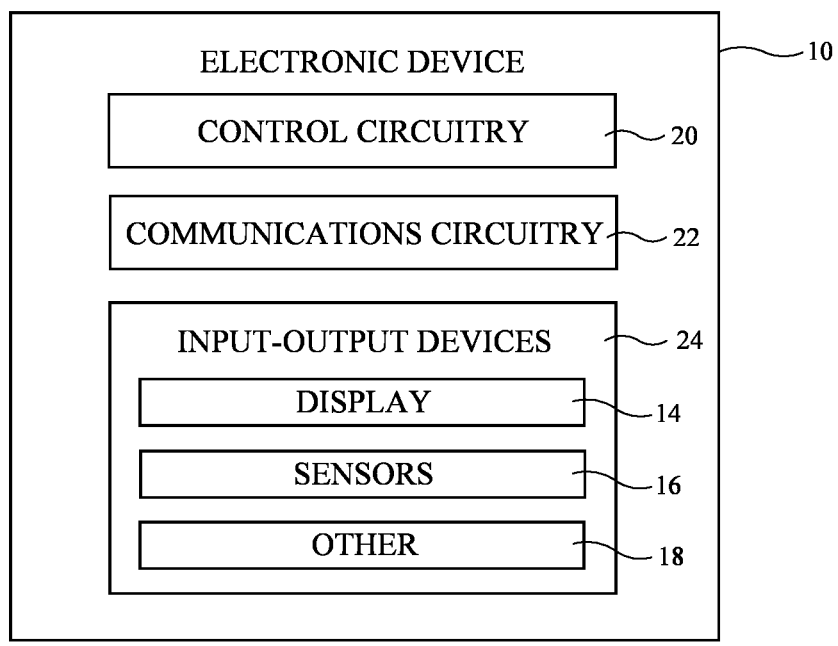
FIG. 1 is a schematic diagram of an illustrative electronic device in accordance with an embodiment.

A schematic diagram of an illustrative electronic device having a display is shown in FIG. 1. Device 10 may be a cellular telephone, tablet computer, laptop computer, wristwatch device or other wearable device, a television, a stand-alone computer display or other monitor, a computer display with an embedded computer (e.g., a desktop computer), a system embedded in a vehicle, kiosk, or other embedded electronic device, a media player, or other electronic equipment. Configurations in which device 10 is a cellular telephone, tablet computer, or other portable electronic device may sometimes be described herein as an example. This is illustrative. Device 10 may, in general, be any suitable electronic device with a display.

Device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use a display and other output devices in providing a user with visual output and other output.

To support communications between device 10 and external equipment, control circuitry 20 may communicate using communications circuitry 22. Circuitry 22 may include antennas, radio-frequency transceiver circuitry (wireless transceiver circuitry), and other wireless communications circuitry and/or wired communications circuitry. Circuitry 22, which may sometimes be referred to as control circuitry and/or control and communications circuitry, may support bidirectional wireless communications between device 10 and external equipment over a wireless link (e.g., circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link). Wireless communications may, for example, be supported over a Bluetooth® link, a WiFi® link, a wireless link operating at a frequency between 6 GHz and 300 GHz, a 60 GHz link, or other millimeter wave link, cellular telephone link, wireless local area network link, personal area network communications link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display 14. Display 14 may be an organic light-emitting diode display, a liquid crystal display, an electrophoretic display, an electrowetting display, a plasma display, a microelectromechanical systems display, a display having a pixel array formed from crystalline semiconductor light-emitting diode dies (sometimes referred to as microLEDs), and/or other display. Configurations in which display 14 is an organic light-emitting diode display or microLED display may sometimes described herein as an example.

Display 14 may have an array of pixels configured to display images for a user. The pixels may be formed as part of a display panel that is rigid or bendable. Configurations in which the display panel is bendable allow device 10 to be folded and unfolded about a bend axis or about multiple bend axes. For example, a flexible (bendable) display in device 10 may be folded so that device 10 may be placed in a compact shape for storage and may be unfolded when it is desired to view images on the display. In a tri-fold device configuration, display 10 may bend about first and second parallel bend axes. Arrangements in which device 10 bends about a single bend axis may sometimes be described herein as an example.

Sensors 16 in input-output devices 24 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices that capture three-dimensional images), optical sensors such as self-mixing sensors and light detection and ranging (lidar) sensors that gather time-of-flight measurements, humidity sensors, moisture sensors, gaze tracking sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 2:
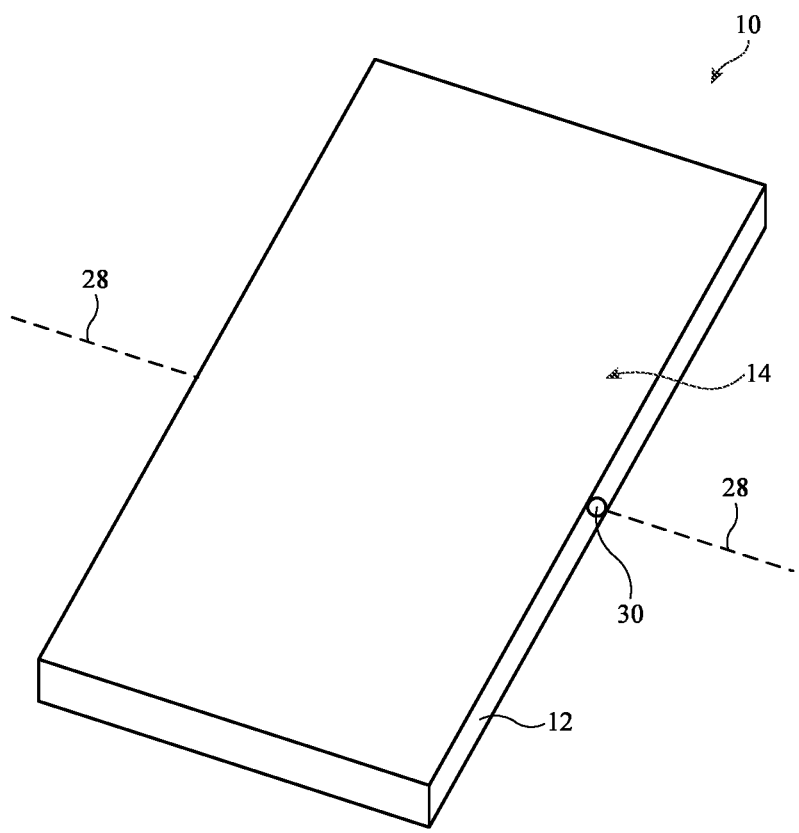
FIG. 2 is a perspective view of an illustrative electronic device with a display in accordance with an embodiment.

FIG. 2 is a perspective view of electronic device 10 in an illustrative configuration in which device 10 is a portable electronic device such as a cellular telephone or tablet computer. As shown in FIG. 2, device 10 may have a display such as display 14. Display 14 may cover some or all of the front face of device 10. Touch sensor circuitry such as two-dimensional capacitive touch sensor circuitry may be incorporated into display 14 (e.g., to gather input from a finger, computer stylus, or other external object).

Display 14 may be mounted in housing 12. Housing 12 may form front and rear housing walls, sidewall structures, and/or internal supporting structures (e.g., a frame, an optional midplate member, etc.) for device 10. Glass structures, transparent polymer structures, and/or other transparent structures that cover display 14 and other portions of device 10 may provide structural support for device 10 and may sometimes be referred to as housing structures. For example, a transparent housing portion such as a glass and/or polymer housing structure that covers and protects a pixel array in display 14 may serve as a display cover layer for the pixel array while also serving as a housing wall on the front face of device 10. In configurations in which a display cover layer is formed from glass, the display cover layer may sometime be referred to as a display cover glass or display cover glass layer. The portions of housing 12 on the sidewalls and rear wall of device 10 may be formed from glass or other transparent structures and/or opaque structures. Sidewalls and rear wall structures may be formed as extensions to the front portion of housing 12 (e.g., as integral portions of the display cover layer) and/or may include separate housing wall structures.

Housing 12 may have flexible structures (e.g., bendable housing wall structures) and/or hinge structures such as hinge 30. Hinge 30 may have a hinge axis aligned with device bend axis 28. Hinge 30 and/or flexible housing structures that overlap bend axis 28 may allow housing 12 to bend about bend axis 28. For example, housing 12 may have a first portion on one side of bend axis 28 and a second portion on an opposing side of bend axis 28 and these two housing portions may be coupled by hinge 30 for rotational motion about axis 28.

Display 14 may be flexible so that as housing 12 is bent about bend axis 28, the flexibility of display 14 allows display 14 to bend about axis 28. In an illustrative configuration, housing 12 and display 14 may bend by 180°. This allows display 14 to be folded back on itself (with first and second outwardly-facing portions of display 14 facing each other). The ability to place device 10 in a folded configuration in this way may help make device 10 compact so that device 10 can be stored efficiently. When it is desired to view images on display 14, device 10 may be unfolded about axis 28 to place device 10 in the unfolded configuration of FIG. 2. This allows display 14 to lie flat and allows a user to view flat images on display 14. The ability to fold display 14 onto itself allows device 10 to exhibit an inwardly folding behavior. Display 14 may be sufficiently flexible to allow device 10 to be folded outwardly and/or inwardly.

Device 10 of FIG. 2 has a rectangular outline (rectangular periphery) with four corners. As shown in FIG. 2, a first pair of parallel edges (e.g., the left and right edges of device 10 in the example of FIG. 2) may be longer than a second pair of parallel edges (e.g., the upper and lower edges of device 10 of FIG. 2) that are oriented at right angles to the first pair of parallel edges. In this type of configuration, housing 12 is elongated along a longitudinal axis that is perpendicular to bend axis 28. Housing 12 may have other shapes, if desired (e.g., shapes in which housing 12 has a longitudinal axis that extends parallel to bend axis 28). With an arrangement of the type shown in FIG. 2, the length of device 10 along its longitudinal axis may be reduced by folding device 10 about axis 28.

Figure 3:
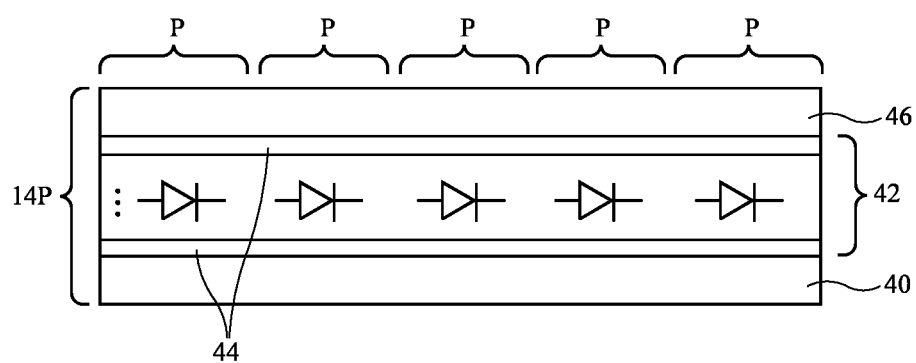
FIG. 3 is a cross-sectional side view of an illustrative display in accordance with an embodiment.

FIG. 3 is a cross-sectional side view of an illustrative flexible display panel for display 14. Display panel 14P of FIG. 3 may have a flexible substrate such as display panel substrate 40. Substrate 40 may be formed from a flexible material such as polymer (e.g., a polyimide substrate layer or other sheet of flexible polymer material), glass (e.g., a layer of glass that is sufficiently thin to allow panel 14P to be bent), and/or other layer(s) and/or combinations of these layers. Pixels P may be formed on top of substrate 40 to form panel 14P. In some embodiments, each pixel P may contain a respective light-emitting diode.

In an illustrative configuration, pixels P are formed from a layer of thin-film display circuitry such as thin-film circuitry 42. Thin-film circuitry 42 includes thin-film layers 44 on substrate 40 (e.g., patterned thin-film layers for forming thin-film transistors, thin-film capacitors, thin-film light-emitting didoes such as organic light-emitting diodes, thin-film layers for forming buffer layers, routing layers that are patterned to form interconnects, encapsulation layers, and/or other display layers). Layers 44 may include organic materials (e.g., polymer buffer layers, organic materials for encapsulation structures, etc.) and/or may include inorganic dielectric (e.g., silicon nitride, silicon oxide, metal oxide layers, etc.). Inorganic dielectric layers may, as an example, form interlayer dielectric for a routing stack, may form portions of an encapsulation layer and/or buffer layer, may form gate oxide structures, etc. In some displays, a polarizer layer such as polarizer 46 (e.g., a flexible circular polarizer having a linear polarizer and quarter wave plate) may be used on the outwardly facing side of panel 14P to suppress ambient light reflections. Polarizing layers may be provided as stand-alone layers and/or may be embedded into thin-film layers and/or embedded into cover layers. To protect display panel 14P, display panel 14P of display 14 may be overlapped by a display cover layer. Display 14 may be provided with a touch sensor. For example, a touch sensor layer such as a two-dimensional capacitive touch sensor for gathering touch input from a finger, stylus, or other external object may be formed from a flexible substrate that is attached between panel 14P and the display cover layer, a touch sensor may be integrated into panel 14P (e.g., by forming capacitive touch sensor electrodes on a common substrate with thin-film display pixel circuitry), or a touch sensor may be integrated into any other layer of display 14. If desired, a touch sensor (and/or other sensor(s) such as force sensors, etc.) may be formed using ultrasonic devices, optical touch sensor circuitry, pressure sensing components, etc. The use of a two-dimensional capacitive touch sensor to provide display 14 with touch sensing capabilities is illustrative.

Figure 4:
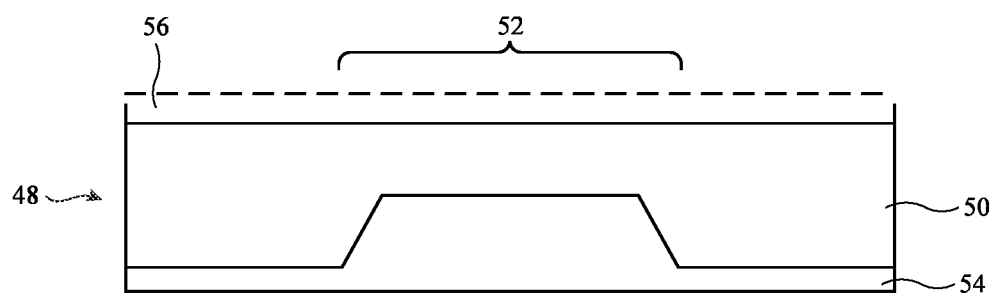
FIG. 4 is a cross-sectional side view of an illustrative display cover layer with a locally thinned hinge region in accordance with an embodiment.

A cross-sectional side view of an illustrative display cover layer that may be used to cover display panel 14P is shown in FIG. 4. As shown in FIG. 4, display cover layer 48 may be formed from a transparent protective layer such as layer 50. Layer 50 may have a thickness of less than 700 microns, less than 300 microns, at least 100 microns, at least 400 microns, or other suitable thickness. Layer 50 may be a transparent layer of polymer and/or glass that allows viewing of display images by a user of device 10. For example, layer 50 may be formed from a layer of glass or polymer that is sufficiently thin to be flexible and/or a layer of glass or polymer having a locally thinned portion such as portion 52 (e.g., a locally thinned strip formed from a recess that runs across the width of layer 50, which is into the page in the orientation of FIG. 4). The presence of optional locally thinned portion 52 and/or the use of flexible material may help layer 48 bend about bend axis 28 during folding of device 10. If desired, there may be multiple locally thinned portions such as portion 52 (e.g., multiple parallel locally thinned regions). Arrangements in which layer 50 is locally softened in one or more regions (e.g., one or more parallel strips) by etching a strip-shaped array of holes into layer 50 may also be used. Flexibility for layer 50 may also be provided by forming layer 50 from multiple stacked layers and ensuring that only a subset of these layers span the locally thinned portion.

As shown in FIG. 4, an optional polymer filler layer such as layer 54 may fill the recess under locally thinned portion 52 and may extend over some or all of the inner surface of layer 50. Optional additional layers such as layer 56 may be included in cover layer 48, if desired. Layers such as layer 56 may include oleophobic layers to prevent fingerprints, hard coats to help prevent scratching, and/or other organic layers, inorganic layers, polymer films, etc. The maximum thickness of layer 50 may be at least 50 microns, at least 150 microns, at least 250 microns, at least 300 microns, 200-400 microns, less than 1000 microns, less than 500 microns, or other suitable maximum thickness value. The minimum thickness of layer 50 may be at least 20 microns, at least 50 microns, at least 150 microns, at least 250 microns, at least 300 microns, 200-400 microns, less than 1000 microns, less than 500 microns, or other suitable minimum thickness value.

Display panel 14P may be supported on one or more supporting structures (e.g., structures formed from polymer, metal, ceramic, glass, and/or other materials that form one or more display panel supporting members). In an illustrative configuration, the support structures for display 14 may include a display support plate formed from metal, glass, and/or other material that is sufficiently rigid to resist deformation when external pressure is applied. The support plate, which may sometimes be referred to as a support member, support structure, backplate, or back film, may, as an example, have a modulus of elasticity of at least 1 GPa.

To allow the metal layer, glass layer, and/or other rigid layer(s) that form the display support plate to bend about bend axis 28, a strip-shaped portion of the display support plate that overlaps and runs along bend axis 28 (and, if desired, other portions of the plate) may be provided with flexibility enhancement openings such as through-hole openings and/or openings that pass partially through the plate. This type of arrangement is shown in the top view of illustrative display support plate 58 of FIG. 5, which has openings 60 in a strip that extends along bend axis 28 to enhance the flexibility of display support plate 58 about bend axis 28. Openings 60 may be circular, oval, rectangular, hexagonal, slot-shaped, and/or may have other shapes. Openings 60 may have lateral dimensions of at least 100 microns, 150-200 microns, less than 300 microns, less than 100 microns, less than 75 microns, or other suitable size. The fill ratio (ratio of opening area to non-opening area in the portion of plate 58 that contains openings 60) may be 40-60%, at least 35%, less than 70%, or other suitable fill ratio value. The thickness of layer 58 may be 75-250 microns, at least 20 microns, at least 50 microns, at least 75 microns, less than 800 microns, less than 500 microns, or less than 250 microns (as examples). Plate 58 may also be provided with a desired amount of flexibility about bend axis 28 by providing plate 58 with a strip-shaped locally thinned region formed from a recess in plate 58 that runs along bend axis 28. This locally thinned plate portion may or may not include openings 60.

During operation of device 10, a user may press a finger, computer stylus, or other external object inwardly against the outermost surface of display 14 or may inadvertently drop an object with sharp curvature onto display 14. For example, a computer stylus may be used to select on-screen items, draw lines, and otherwise control the operation of device 10. A cross-sectional side view of device 10 in an illustrative configuration in which an external object is pressing against display 14 is shown in FIG. 6.

Figure 6:
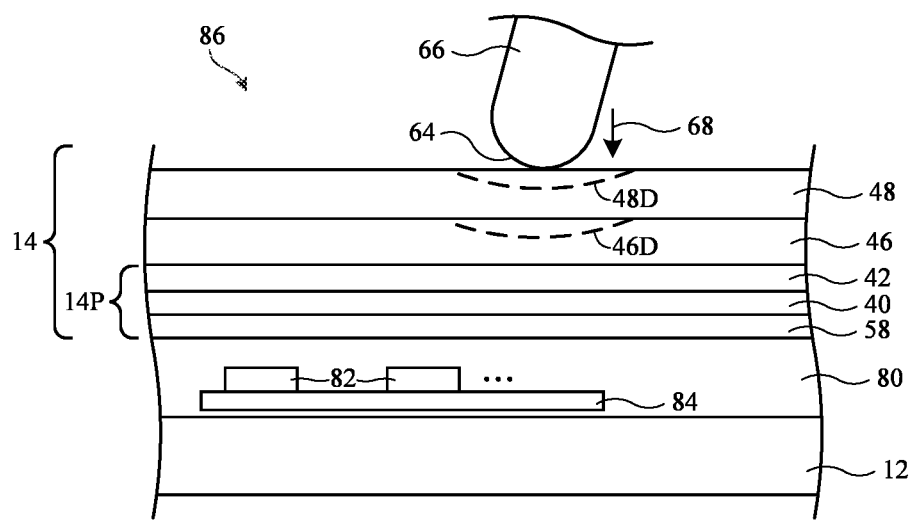
FIG. 6 is a cross-sectional side view of a portion of a display in accordance with an embodiment.

As shown in FIG. 6, device 10 may have a housing such as housing 12 to which display 14 may be coupled. The walls of housing 12 and display 14 may separate exterior region 86, which surrounds device 10, from interior region 80. Electrical components 82 (see, e.g., the circuitry of FIG. 1) may be mounted in interior region 80 (e.g., using printed circuits such as printed circuit 84).

During operation, display 14 may be used to present images viewable from exterior region 86. A user may interact with device 10 by providing input to device 10 while viewing images displayed on display 14. As shown in the example of FIG. 6, tip 64 of external object 66 (e.g., a tip with a radius of curvature of 0.5-1 mm or other tip 64 of an object such as a computer stylus) may be used to provide stylus input to a two-dimensional capacitive sensor and/or other sensor in device 10 that overlaps display 14. When an object with sharp curvature is inadvertently dropped onto display 14 or during use of object 66 in supplying device 10 with input, a sharply curved structure such as tip 64 may press inwardly in direction 68, thereby locally deforming display cover layer 48 as shown by dashed line 48D. This, in turn, can result in local deformation of underlying soft layers in display 14 such as touch sensor layers and/or polarizer layers (see, e.g., layer 46, which may deform as shown by dashed line 46D).

Display panel 14P and/or display support plate 58 may be configured to help avoid deformation of the potentially brittle inorganic layers and/or other structures of thin-film circuitry 42 due to the deformation of cover layer 48 and layer 46 from tip 64 of object 66. For example, the amount of polymer adhesive or other soft material between layer 42 and support plate 58 may be maintained at a suitably low level. This ensures that the lower surface of circuitry 42 will be stiffly supported to help avoid excessive localized deformation of the thin-film layers in circuitry 42. In this way, cracking and other damage to circuitry 42 can be avoided.

Figure 7:
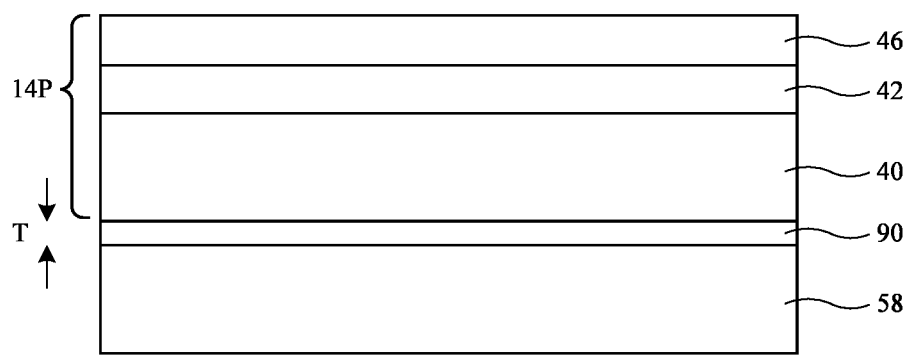
FIG. 7 is a cross-sectional side view of illustrative display structures in which a thin adhesive layer has been used to attach a display panel substrate to a display support plate in accordance with an embodiment.

Consider, as an example, the cross-sectional side view of display 14 in FIG. 7. As shown in FIG. 7, substrate 40 of display panel 14P may be attached to support plate 58 using polymer adhesive layer 90. In some arrangements, the polymer used in forming the adhesive of layer 90 may be relatively soft (e.g., the adhesive may have a modulus of elasticity of less than 1 GPa, less than 500 MPa, etc.) and therefore subject to deformation under applied pressure on the surface of display 14 from external object 66. To prevent excessive deformation in layer 14, the total thickness T of layer 90 may be less than 20 microns, less than 15 microns, 10 microns, or less than 5 microns (as examples). Because use of a relatively small value of thickness T for layer 90 helps to reduce deformation of circuitry 42, this arrangement may help prevent cracking and other damage to the thin-film layers in circuitry 42 from external object 66.

If desired, substrate 40 may also have a thickness that helps prevent excessive localized deformation of substrate 40 from object 66. As an example, the thickness of substrate 40 may be 10-50 microns. In some configurations, increased thickness for substrate 40 will help reduce localized deformation.

In an illustrative configuration, adhesive layer 90 may be relatively stiff (e.g., layer 90 may have a modulus of elasticity of 1-2 GPa, at least 0.8 GPa, at least 1 GPa, etc.). The use of stiff material for layer 90 (and, if desired, a small value of T) may help prevent deformation of layer 90 that could lead to deformation of circuitry 42.

In some arrangements, the modulus of elasticity of substrate 40 (e.g., a polyimide substrate layer) may be larger than the modulus of elasticity of layer 90. In an illustrative configuration, layer 90 may be formed from a polymer having a modulus of elasticity of less than 0.5 GPa (as an example) and substrate 40 may be formed from a polymer having a larger modulus (e.g., 9-20 GPa, at least 6 GPa, at least 8 GPa, at least 9 GPa, etc.). If desired, substrate 40 may be formed from a material such as glass (e.g., a layer of glass with a thickness of less than 100 microns or other suitable thickness to allow bending about bend axis 28).

Figure 8:
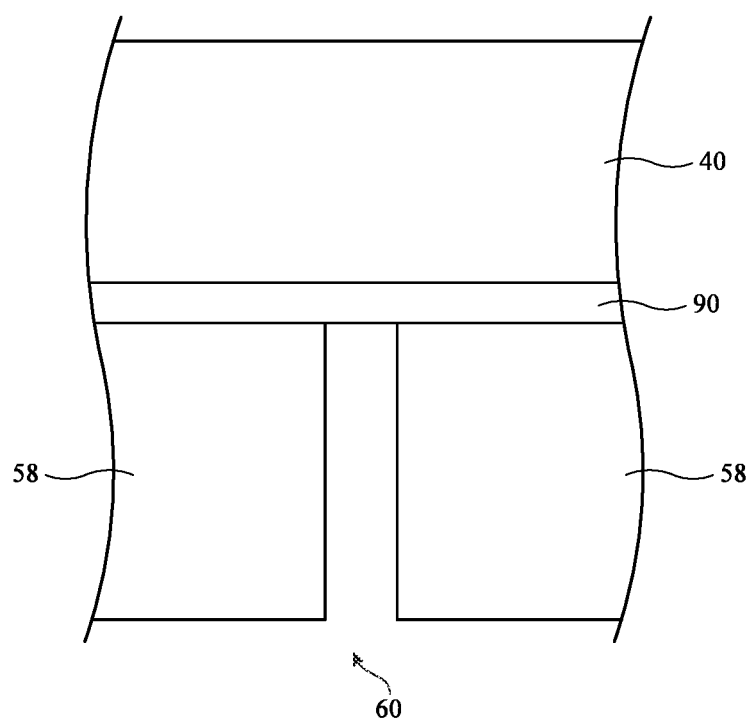
FIGS. 8, 9, 10, 11, 12, 13, 14, 15, 16, 17, and 18 are cross-sectional side views of illustrative display structures with adhesive for attaching display panel substrates to display support plates in accordance with embodiments.

FIG. 8 is a cross-sectional side view in which polymer adhesive layer 90 has been used to attach substrate 40 to support plate 58. One side of layer 90 is bonded to substrate 40 and the opposing side of layer 90 is bonded to plate 58.

Figure 5:
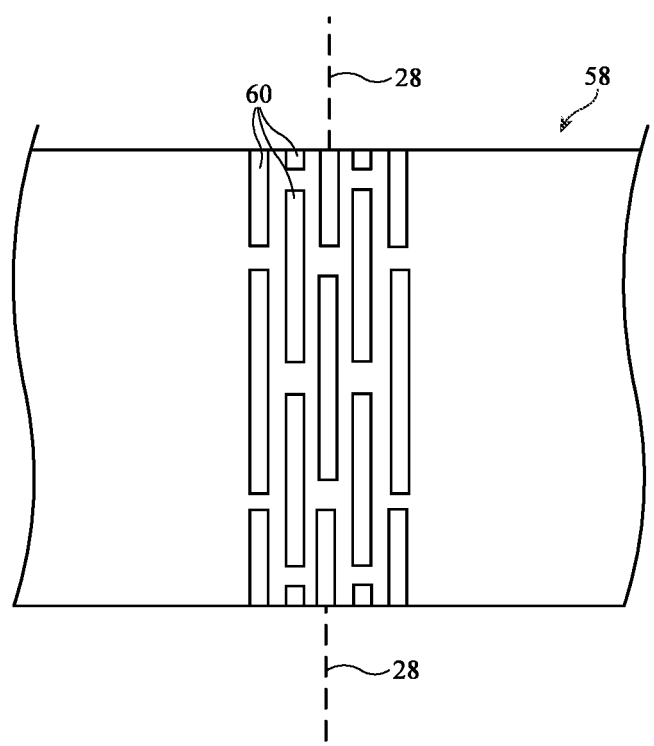
FIG. 5 is a top view of an illustrative display support plate with flexibility enhancement openings in accordance with an embodiment.

As described in connection with FIG. 5, at least the portion of plate 58 that overlaps bend axis 28 may be provided with flexibility enhancing openings such as opening 60. Openings such as opening 60 of FIG. 8 may, as an example, be through-hole openings. Air, liquid, soft polymer, and/or other materials (e.g., materials with elastic modulus values of less than 1 GPa, less than 200 MPa, etc.) may be present in openings 60. Openings 60 may be evenly or unevenly spaced from each other across plate 58. For example, the density of openings 60 may be enhanced over axis 28 relative to other portions of plate 58. Openings 60 may be formed by laser drilling, machining, wet and/or dry etching (one-sided or two-sided), stamping, and/or other fabrication techniques. If desired, plate 58 may be formed from multiple layers of material (e.g., a first layer with an array of openings 60 to which a second layer with no openings is attached by welds, adhesive, etc.).

Figure 9:
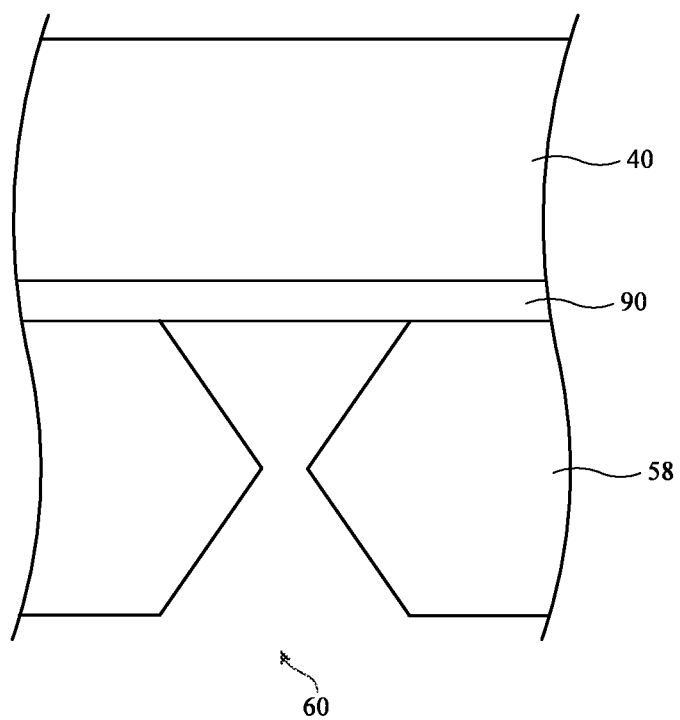
Figure 10:
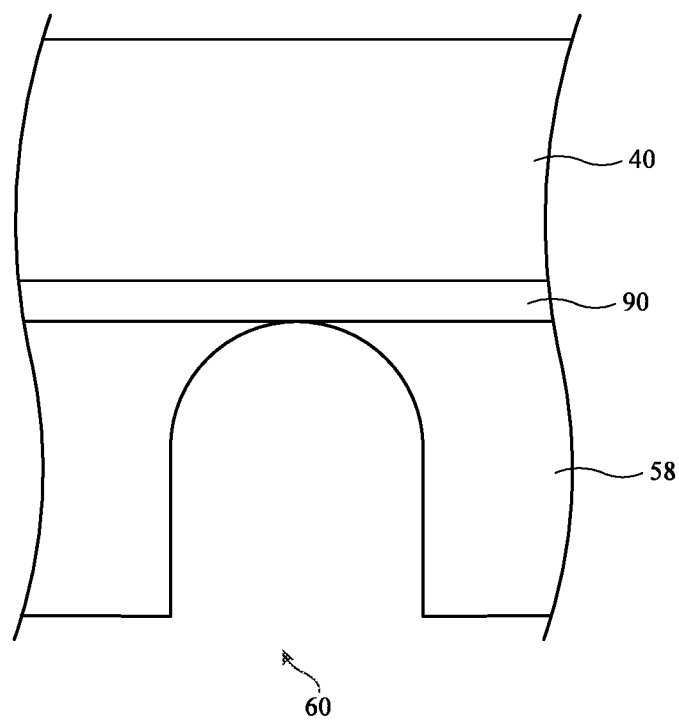

The illustrative configuration of FIG. 8 has openings 60 with straight vertical sidewalls. If desired, openings 60 may have different profiles as shown in the examples of FIGS. 9 and 10.

Figure 11:
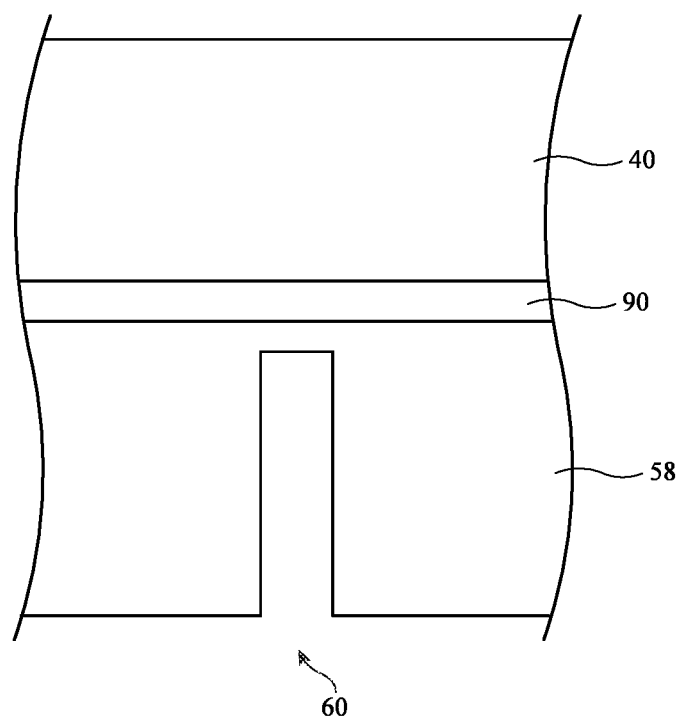
Figure 12:
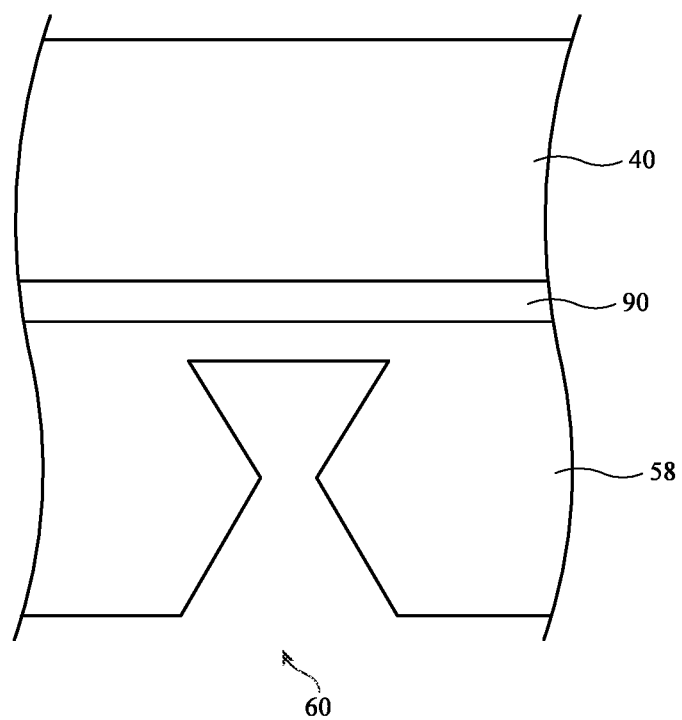
Figure 13:
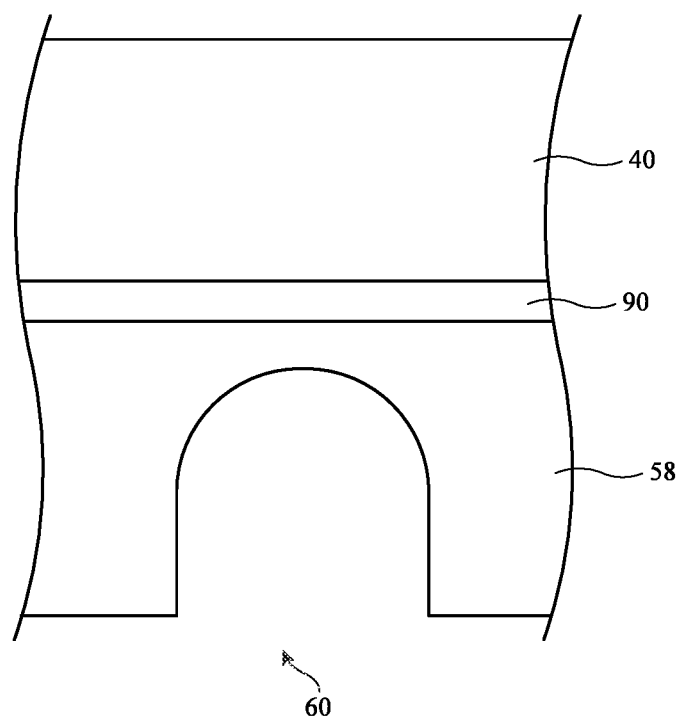

FIG. 11 shows how openings 60 may pass only partway through plate 58 (which may be formed from a single structure or multiple structures attached with welds and/or other attachment mechanisms). With configurations of the type shown in FIG. 11, the portion of plate 58 that overlaps each opening 60 may help provide vertical support for layer 90 and thereby help to prevent excess deformation of substrate 40. Openings 60 in this type of arrangement may have any suitable cross-sectional shape. In the example of FIG. 12, opening 60 has a narrowed middle portion. In the example of FIG. 13, opening 60 has curved sidewalls forming a downwardly facing dome.

Figure 14:
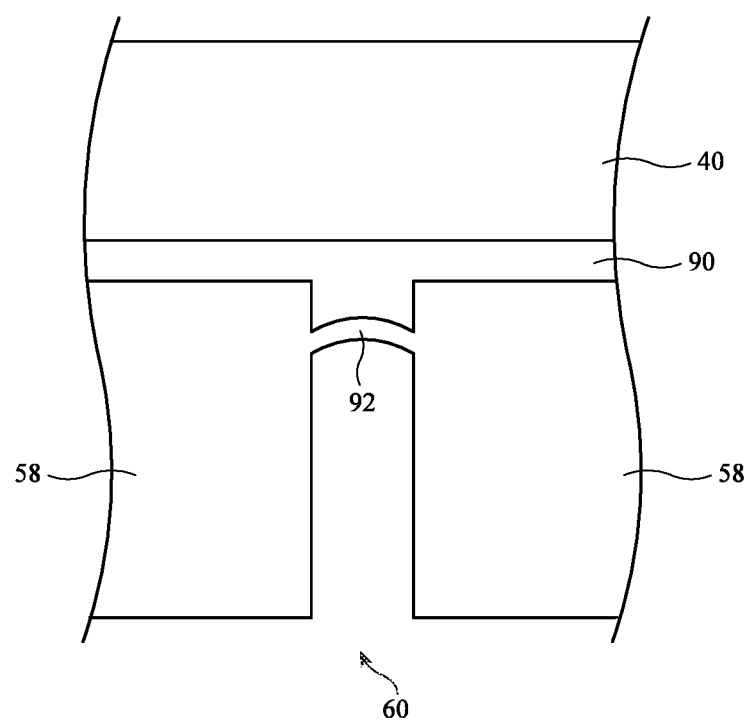

As shown in the example of FIG. 14, the upper portions of openings 60 may be partly or completely bridged by flexible linkage structures such as linkage 92. Linkage 92 may be, for example, a thinned portion of plate 58 with a curved (e.g., bowed) cross-sectional profile that helps hold adjacent portions of plate 58 together while allowing plate 58 to flex. The adhesive of layer 90 may lie in a single layer (e.g., without penetrating into opening 60) or may, as shown in FIG. 14, at least partly penetrate into opening 60 (e.g., the portion of opening 60 above linkage 92 may be filled with adhesive).

Figure 15:
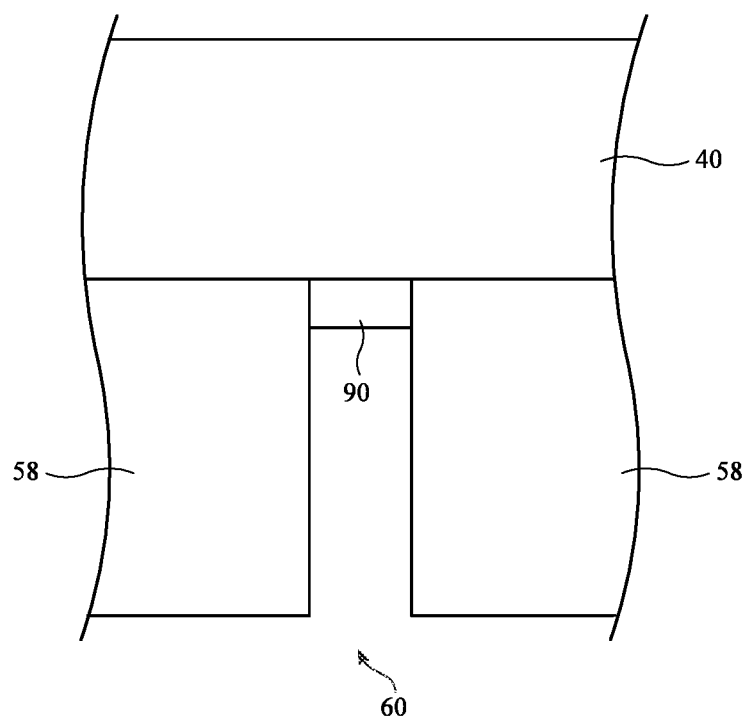
Figure 16:
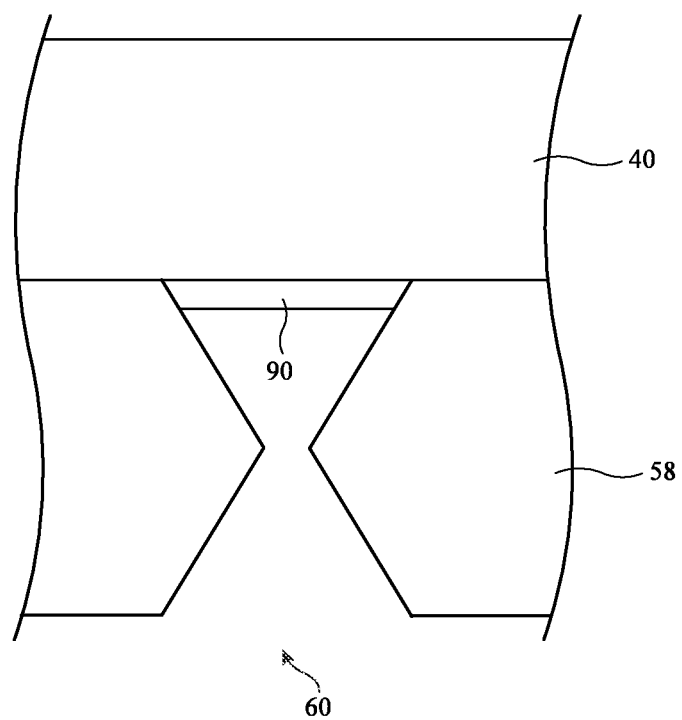
Figure 17:
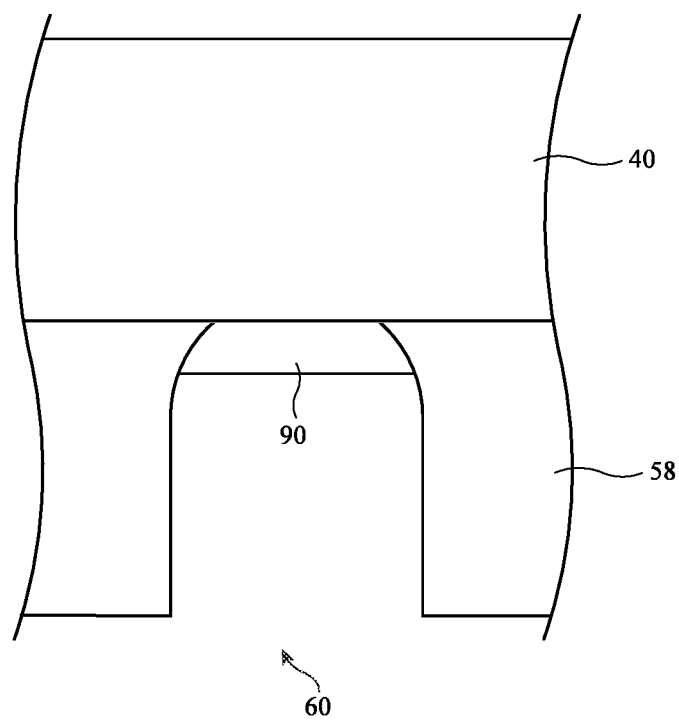
Figure 18:
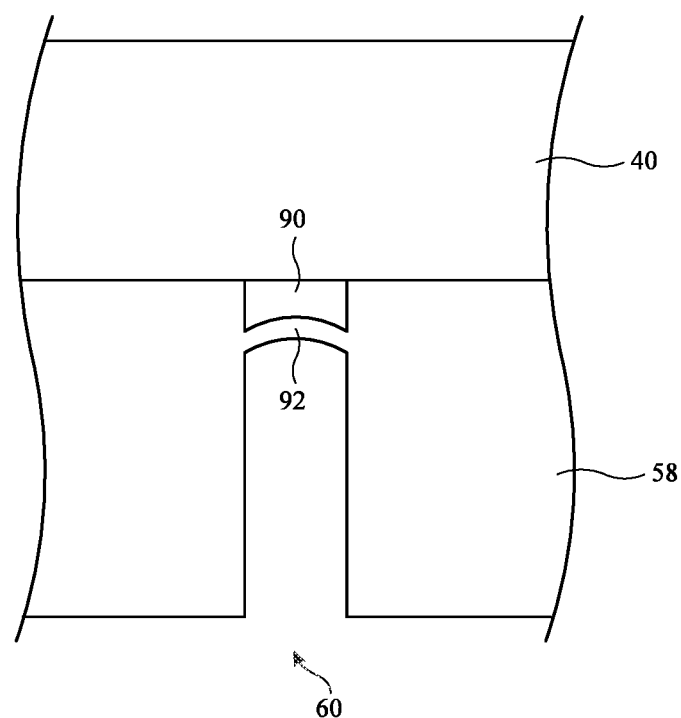

If desired, the soft polymer adhesive material of layer 90 may be eliminated between the inwardly facing surface of substrate 40 and the opposing outwardly facing surface of support plate 58. In this type of arrangement, which is shown in FIG. 15, the inwardly facing surface of substrate 40 directly contacts the outwardly facing surface of plate 58. The adhesive of layer 90 may be located only in the upper portions of openings 60. Adhesive bonds at the sides of openings 60 and on the portions of the inwardly facing surface of substrate 40 that overlap openings 60 can be used to attach substrate 40 to plate 58. This type of arrangement may be used with openings of any suitable shape (see, e.g., the illustrative cross-sectional profiles of openings 60 of FIGS. 16 and 17). FIG. 18 shows how the polymer adhesive of layer 90 may be formed in openings 60 over linkages such as linkage 92. Although openings 60 of FIGS. 15, 16, 17, and 18 are only partly filled with adhesive, adhesive and/or other soft materials (e.g., polymer) may fill most or all of openings 60, if desired. The approach of FIGS. 15, 16, 17, and 18 in which a plug of adhesive is formed only at the top of each opening 60 is illustrative.

Thermoplastic bonding may be used to attach substrate 40 to plate 58. For example, substrate 40 may be formed from a stiff thermoplastic polymer that can be softened under application of heat and pressure. Under these conditions, substrate 40 may be bonded directly to plate 58, without an intervening soft adhesive layer. The modulus of elasticity of the thermoplastic material (e.g., substrate 40) in this type of arrangement may be, as an example, at least 1 GPa or at least 2 GPa. To ensure compatibility with thin-film circuitry 42, it may be desirable to form substrate 40 from a material such as polyimide or glass. In this type of configuration, a stiff layer of the thermoplastic polymer that is separate from substrate 40 may be interposed between substrate 40 and plate 58 and may form a bonding layer. The thermoplastic polymer that is used to form this type of bonding layer to attach display panel 14P to support plate 58 may soften and/or liquify under application of heat and pressure and may resolidify and bond to adjacent surfaces when cooled. Configurations in which substrate 40 is bonded to plate 58 using a separate thermoplastic polymer layer may be described herein as an example.

Figure 19:
FIGS. 19, 20, 21, 22, and 23 are cross-sectional side views of illustrative display structures with thermoplastic attachment mechanisms for attaching display panels to support plates in accordance with embodiments.
Figure 20:
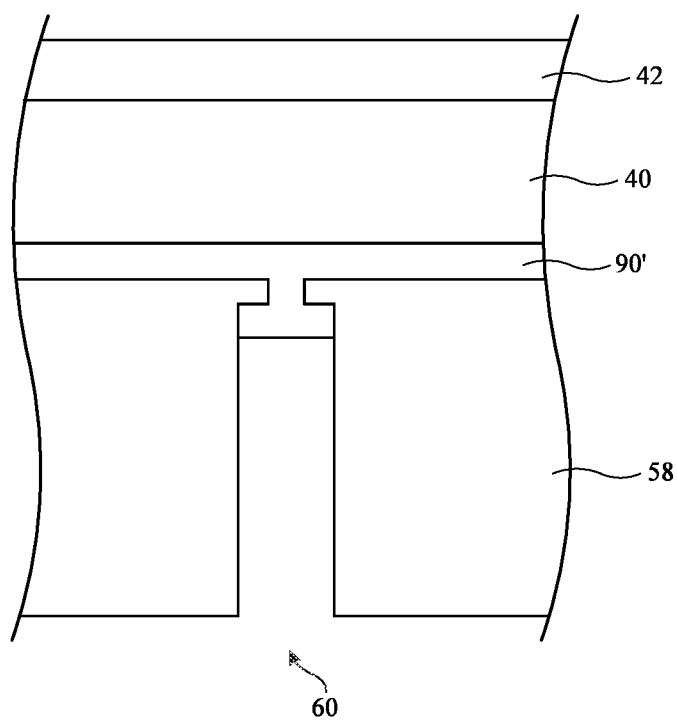
Figure 21:
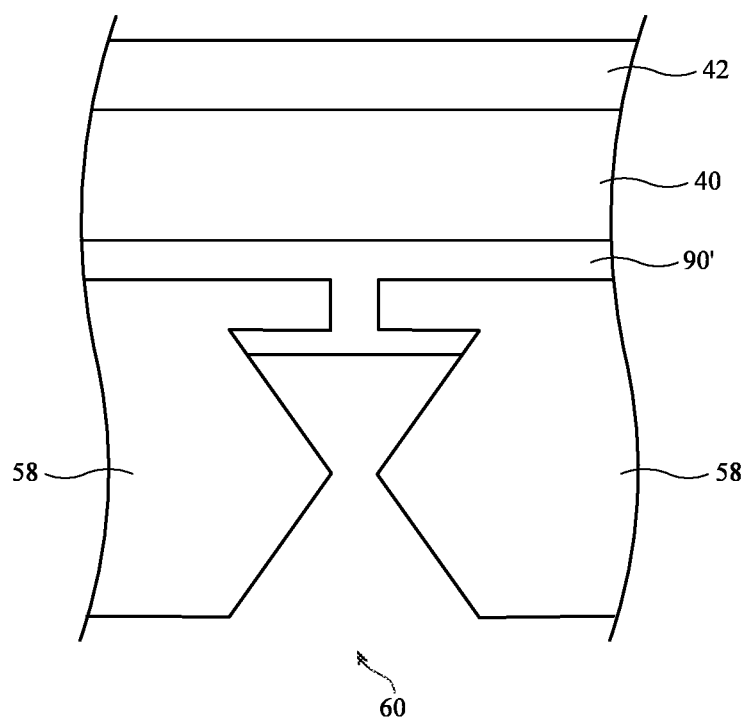
Figure 22:
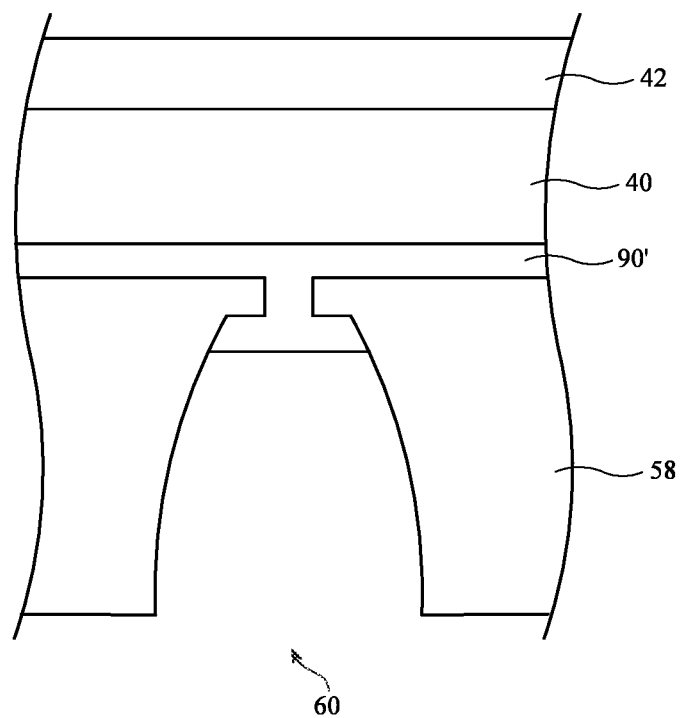

In the example of FIG. 19, substrate 40 of display panel 14P is bonded to the surface of plate 58 with thermoplastic polymer layer 90'. FIG. 20 shows how openings 60 may have narrowed upper portions to help engage portions of thermoplastic polymer layer 90' that have flowed into the upper regions of openings 60. Once resolidified, the portions of layer 90' that protrude into the narrowed upper portions of openings 60 will help lock layer 90' and substrate 40 to plate 58. FIGS. 21 and 22 show different illustrative cross-sectional profiles that may be used in forming openings 60.

Figure 23:
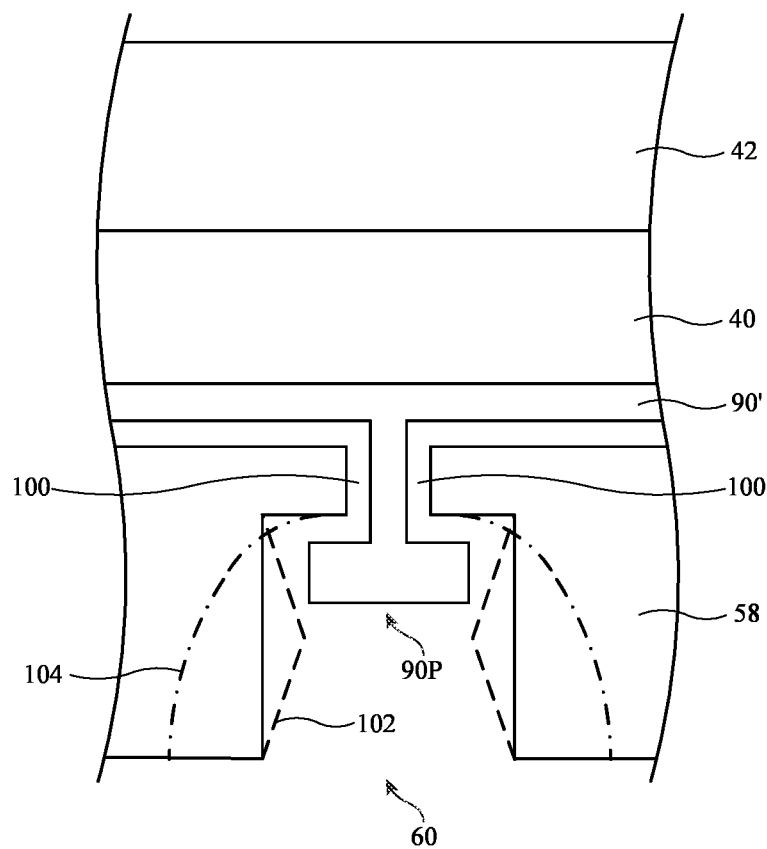

If desired, lateral gaps may be formed between the sides of the inwardly protruding portions of bonding layer 90' and adjacent sidewalls of openings 60. This type of arrangement is shown in FIG. 23. As shown in FIG. 23, circuitry 42 may be formed on substrate 40 and bonded to plate 58 using thermoplastic layer 90'. Layer 90' may be formed from thermoplastic polymer that protrudes inwardly through the narrowed upper portion of each opening 60 to form protruding portions 90P. Portions 90P may have shapes configured to hold layer 90' and substrate 40 to the surface of support plate 58. Due to shrinkage following cooling, selective material removal, and/or other fabrication operations, gaps 100 (e.g., gaps filled with air, liquid, low modulus polymer, etc.) may be formed between the sides of each protruding portion 90P and adjacent sidewalls of openings 60. These gaps allow portions 90P (and therefore layer 90' and substrate 40) to slide slightly (e.g., to shift laterally, parallel to the surface of plate 58) as display 14 is folded and unfolded. The sides of openings 60 may be straight (tapered, vertical, etc.) and/or may be locally narrowed (see, e.g., profile lines 102) and/or curved in profile (see, e.g., profile lines 104).

Although sometimes described in the context of folding devices, the use of structures that help resist damage to thin-film circuitry in display 14 from pressure from objects with sharp curvature can be used in any suitable electronic device 10. Device 10 may, as an example, be a cellular telephone, tablet computer, wristwatch, laptop computer or other device with a display that does not fold. Device 10 may also be provided with a foldable housing that folds about two or more bend axes (e.g., device 10 may have a tri-fold device housing).

The foregoing is merely illustrative and various modifications can be made to the described embodiments. The foregoing embodiments may be implemented individually or in any combination.

What is claimed is:

1. An electronic device, comprising:
   a foldable housing that is configured to bend about a bend axis;
   a flexible display panel that overlaps the bend axis, wherein the flexible display panel comprises thin-film display circuitry on a substrate;
   a display support plate configured to bend about the bend axis; and
   a polymer layer that attaches the substrate to the display support plate, wherein the polymer layer has first and second opposing sides, wherein the polymer layer is bonded to the substrate on the first side, wherein the display support plate has openings that extend along the bend axis, wherein the polymer layer has protruding portions on the second side that protrude into the openings and attach the flexible display panel to the display support plate, and wherein the protruding portions of the polymer layer only partially fill the openings.

2. The electronic device defined in claim 1 wherein the substrate comprises thermoplastic polymer.

3. The electronic device defined in claim 1 wherein the thin-film display circuitry is configured to form light-emitting diodes.

4. The electronic device defined in claim 1 wherein the display support plate comprises a layer selected from the group consisting of: a metal layer and a glass layer.

5. The electronic device defined in claim 1 further comprising gaps between the protruding portions and adjacent sidewalls of the openings.

6. The electronic device defined in claim 1 wherein the substrate has an elastic modulus of at least 1 GPa.

7. The electronic device defined in claim 6 wherein the display support plate comprises metal.

8. The electronic device defined in claim 7 further comprising:
a display cover layer; and
a polarizer between the display cover layer and the thin-film display circuitry.

9. An electronic device, comprising:
a foldable housing that is configured to bend about a bend axis;
a flexible display panel that overlaps the bend axis, wherein the flexible display panel has a layer of thin-film display circuitry on a substrate;
a display support plate configured to bend about the bend axis, wherein the display support plate has flexibility enhancing openings and wherein the display support plate includes a linkage structure that bridges a given opening of the flexibility enhancing openings; and
a polymer adhesive layer that attaches the substrate to the display support plate, wherein a portion of the polymer adhesive layer protrudes into the given opening and extends to the linkage structure.

10. The electronic device defined in claim 9 wherein the display support plate comprises a metal display support plate or a glass display support plate.

11. The electronic device defined in claim 10 wherein the portion of the polymer adhesive layer extends between the substrate and the linkage structure.

12. The electronic device defined in claim 11 wherein the given opening is defined by sidewalls of the display support plate and wherein the linkage structure is coupled between the sidewalls.

13. The electronic device defined in claim 11 wherein the given opening is defined by sidewalls of the display support plate and wherein the portion of the polymer adhesive layer extends between the sidewalls.

14. The electronic device defined in claim 10 wherein the polymer adhesive layer comprises an additional planar portion between the substrate and the display support layer and wherein the portion of the polymer adhesive layer protrudes into the given opening from the additional planar portion of the polymer adhesive layer.

15. An electronic device, comprising:
a foldable housing that is configured to bend about a bend axis;
a flexible display panel that overlaps the bend axis, wherein the flexible display panel has a layer of thin-film display circuitry on a display panel substrate; and
a display support plate configured to bend about the bend axis, wherein the display panel substrate has an inwardly facing surface, wherein the display support plate has an opposing outwardly facing display support plate surface that is directly attached to the inwardly facing surface using a polymer layer, and wherein the polymer layer comprises a planar polymer layer having a modulus of elasticity of at least 1 GPa and having first and second opposing surfaces, the first surface contacting the inwardly facing surface of the display panel substrate and the second surface contacting the outwardly facing display support plate surface.

16. The electronic device defined in claim 15 wherein the display support plate comprises flexibility enhancing openings.

17. The electronic device defined in claim 16 wherein the polymer layer comprises polymer adhesive, wherein portions of the polymer adhesive are in portions of the flexibility enhancing openings, and wherein the polymer adhesive is attached to sidewalls of the flexibility enhancing openings and is attached to portions of the inwardly facing surface.

18. The electronic device defined in claim 15 wherein the display panel substrate has a thickness of 20-50 microns.

19. The electronic device defined in claim 15 wherein the display panel substrate has a modulus of elasticity of 9-20 GPa.

20. The electronic device defined in claim 15 wherein the display support plate comprises glass, wherein the display support plate comprises flexibility enhancing openings, and wherein the flexibility enhancing openings extend along a strip-shaped region that overlaps the bend axis.

21. An electronic device, comprising:
a housing;
a display panel that overlaps a bend axis, wherein the display panel has a layer of thin-film display circuitry on a substrate;
a display support plate having a plurality of openings that extend along the bend axis; and
a polymer layer that attaches the substrate to the display support plate, wherein the polymer layer comprises a planar layer having first and second opposing surfaces, wherein the first surface is bonded to the substrate, wherein the second surface is bonded to the display support plate, wherein a distance separating the substrate and the display support layer across the planar layer is less than 15 microns, wherein the planar layer has a portion that overlaps the plurality of openings, wherein the plurality of openings pass partly through the display support plate, and wherein a portion of the display support plate separates the plurality of openings from the portion of the planar layer.

22. The electronic device defined in claim 21 wherein the polymer layer is a polymer adhesive layer.

23. The electronic device defined in claim 22 further comprising a display cover layer overlapping the display panel, wherein the display cover layer has a thickness of less than 300 microns.

* * * * *